(12) United States Patent
Peshkin et al.

(10) Patent No.: US 6,542,537 B1
(45) Date of Patent: Apr. 1, 2003

(54) REDUCTION OF CPU BURDEN IN MONITORING DATA FOR ESCAPE SEQUENCES

(75) Inventors: Joel D. Peshkin, Irvine, CA (US); Paul Wren, Valbonne (FR)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/264,777

(22) Filed: Mar. 9, 1999

(51) Int. Cl.⁷ .............................. H04B 1/38; H04L 5/16
(52) U.S. Cl. ....................................... 375/222; 708/212
(58) Field of Search ............................... 375/222, 220, 375/219; 708/212; 379/93.28, 93.31

(56) References Cited

U.S. PATENT DOCUMENTS

| | | | |
|---|---|---|---|
| 4,549,302 A | | 10/1985 | Heatherington |
| H1413 H | * | 2/1995 | Gunn ..................... 375/222 G |
| 6,373,885 B1 | * | 4/2002 | Wahl ......................... 375/222 |

OTHER PUBLICATIONS

Modem Industry Proposal by: Floyd Kling, Ven–Tel Inc., "Time Independent Escape Sequence For Modems (TIES)", Revision: 1.06, Nov. 18, 1991, pp. 1–3.

* cited by examiner

*Primary Examiner*—Phuong Phu
(74) *Attorney, Agent, or Firm*—Farjami & Farjami LLP

(57) ABSTRACT

A communication system implements a system for reducing the processing burden associated with detecting an escape sequence in a set of data. The quantity of data contained within the modem's data buffer is intermittently compared to a threshold. While the quantity of data remains above a selected threshold, the data is not checked for an escape sequence. If the quantity of data falls below the threshold, the modem initiates an escape sequence detection procedure. Because the data source waits for a confirmation signal from the modem after sending the escape sequence, additional data will not be received in the data buffer. Thus, the escape sequence is typically among the most recently received data in the data buffer. As the modem processes the data in the buffer, the quantity falls below the threshold, activating the escape sequence detection procedure.

38 Claims, 6 Drawing Sheets

REDUCTION OF CPU BURDEN IN MONITORING DATA FOR ESCAPE SEQUENCES

BACKGROUND OF THE INVENTION

1. Field of the Invention

The present invention relates to communication systems, and more particularly, to communications for computers.

2. Description of the Related Art

As computers have become ubiquitous, the usefulness of the computers has increased by interconnecting them with other computers. To take advantage of the existing analog telephone network, modems were developed to facilitate transmission between computers via conventional telephone connections. Initially, modems were strictly passive devices connected to a port on a host computer and could modulate data sent from the host computer and demodulate data received over the telephone lines. As modem technology advanced, microcontroller units (MCUs) were added to modems. Many of the configuration and control functions previously performed by the host computer were assumed by the MCU, such as initiating a call, dialing a number, recognizing busy tones, and the like.

The addition of the MCU, however, did not eliminate the need for the host computer to direct the modem operations. Modems typically cannot determine which telephone number to call, whether to answer an incoming call, which data transmission speed may be desired, and many other parameters; the host computer directs these functions via commands sent to the modem.

Conventional modems provide only two physical links to the host computer, one for transmitting and the other for receiving. Consequently, command information for controlling the modem is transmitted over the same link as data information to be transmitted to the destination, and is commonly interspersed with such data information.

A modem typically operates in transmission mode, in which information received by the modem is transmitted to the destination. To process command information, the modem switches to a command mode. One approach to signaling the modem to switch to command mode is to send an escape sequence. In this approach, the MCU checks every character sent from the host computer for the presence of the escape sequence. If detected, the modem enters command mode, processing all data as commands until receipt of a carriage return, signifying the end of the commands. The modem then returns to transmission mode and resumes checking every character until another escape sequence is detected. This approach, however, is susceptible to false detections of an escape sequence because a block of text may include the characters corresponding to the escape sequence.

Another approach to discriminating commands from message data is disclosed in U.S. Pat. No. 4,549,302, issued to Dale A. Heatherington, on Oct. 22, 1985. The Heatherington patent discloses an escape sequence which utilizes a string of predetermined characters (in this case "+++") to signal the modem to enter command mode. The Heatherington approach also requires a one second pause before and after the "+++" escape sequence to create a generally acceptable method of detecting commands when used in conjunction with low data transmission rates. However, for high data rates, a two-second delay may result in significant delays.

Another approach used to determine when a modem should switch from transmission mode to command mode is the Timing Independent Escape Sequence (TIES) system. Under TIES, illustrated in FIG. 1, the MCU analyzes the data stream as it passes through the modem until it detects the first character of an escape sequence (step 1). Upon detecting the first character, such as "+" for a "+++" escape sequence, the MCU waits (step 2) and checks the next character (step 3) to see if it is the second character of the escape sequence. If the second character is not a "+", the MCU waits for the next character (step 0) and resumes checking the data stream. If the second character is a "+", the MCU waits (step 4) and checks the third character (step 5). If the third character is a "+", a portion of the escape sequence has been received, and the MCU starts a timer (step 6). The MCU then waits for either another character to be sent or for the timer to expire (step 7). If another character is sent prior to time running out (step 8), the MCU checks whether the character is an "A", the first character of any valid conventional "AT" command. If the character is not an "A", the following data is not a command and is processed as data information.

Assuming additional characters are not sent prior to the timer expiring (step 7), the MCU waits for the timer to expire (step 8), sends the confirmation "OK" signal (step 9), and waits for the next character (step 10). If a valid escape sequence was sent, the next character sent by the host computer should be an "A" (step 11), followed by a "T" (step 13). Thus, the MCU, checks every character for the escape sequence. Consequently, with the high data rates utilized in modern modems, TIES may overwork the MCU and significantly degrade modem performance.

For the host computer, checking all the data coming from the modem for commands, responses to commands, and the like is normally acceptable because the host computer's operating speed is significantly faster than the modem's. For example a Pentium™ operating at 200 MHz operates at a much higher speed than a modem transferring data at 56.6K bps. For the modem, however, checking all the data coming from the computer for commands may degrade performance.

This is especially true in host provider systems wherein a host computer may be connected at any time to a plurality of remote users. For example, a modem may provide multiple physical channels for data transmission. The host computer may be connected to the multichannel modem via a single bus, for example using time division multiplexing or multiple logical channels. The data rate between the modem and the host computer is typically significantly higher than the data rate through each of the individual physical channels. Checking each character received from the host computer to verify whether it is an escape sequence may significantly degrade the modem's performance or require an extremely fast, and therefore costly, MCU.

SUMMARY OF THE INVENTION

A communication system according to various aspects of the present invention implements a system for reducing the processing burden of detecting an escape sequence in a modem. The communication system monitors the quantity of data contained within the modem's data buffer. While the quantity of data remains above a selected threshold, the data is not checked for an escape sequence. When the quantity of data falls below the threshold, the modem initiates an escape sequence detection procedure. Because the data source waits for a confirmation signal from the modem after sending the escape sequence, additional data is not received in the data buffer. Consequently, the escape sequence is typically among the most recently received data in the data buffer. As the modem processes the data in the buffer, the quantity falls below the threshold, activating the escape sequence detection procedure. When the escape sequence is identified, the modem enters command mode.

BRIEF DESCRIPTION OF THE DRAWING FIGURES

The subject matter of the invention is particularly pointed out and distinctly claimed in the concluding portion of the specification. The invention, however, both as to organization and method of operation, may best be understood by reference to the following description taken in conjunction with the claims and the accompanying drawing, in which like parts may be referred to by like numerals:

DETAILED DESCRIPTION OF PREFERRED EXEMPLARY EMBODIMENTS

Figure 1:
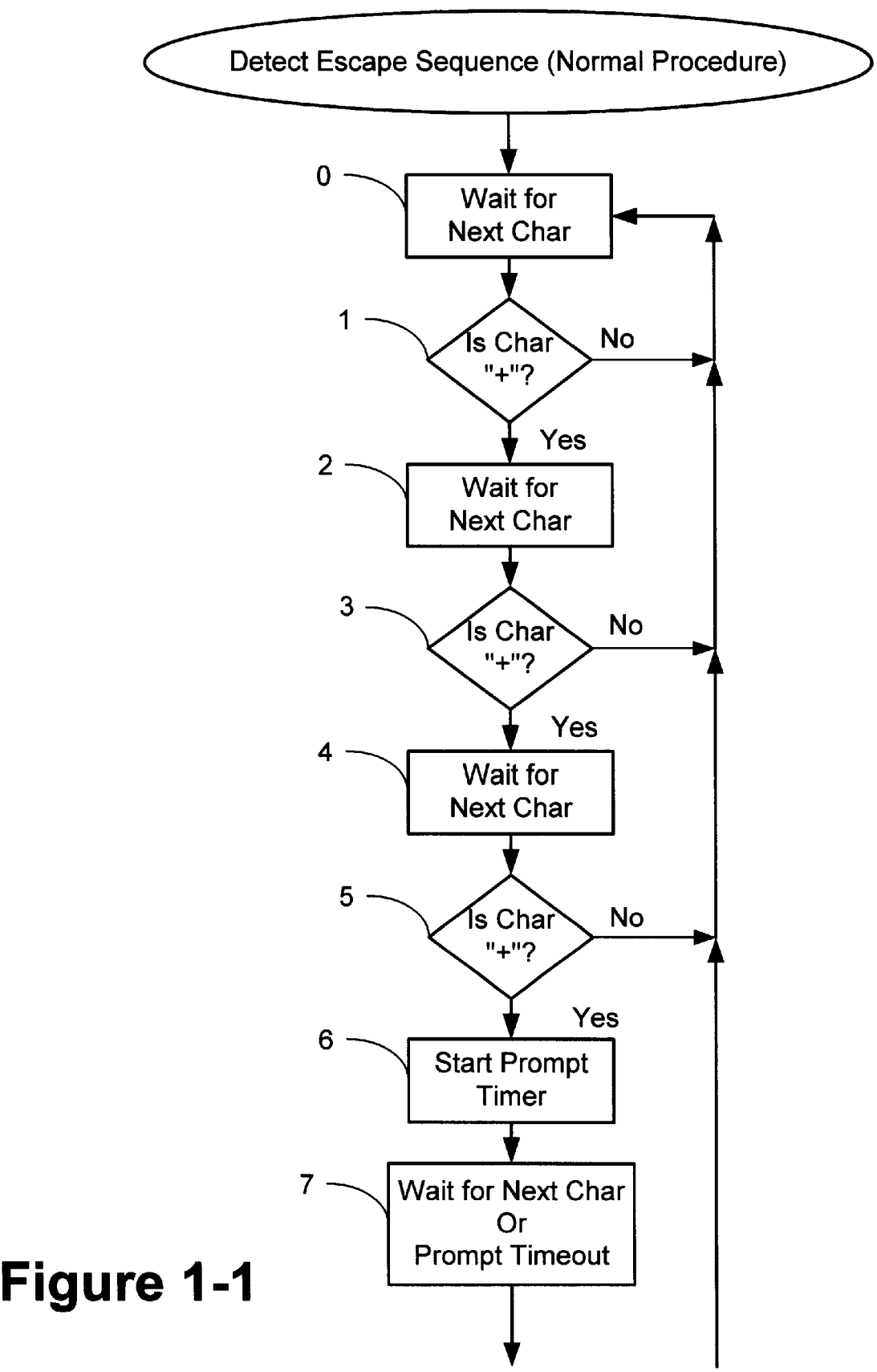
FIG. 1 is a flow chart of the algorithm utilized under the TIES approach to detect an escape sequence.
Figures 1, 2:
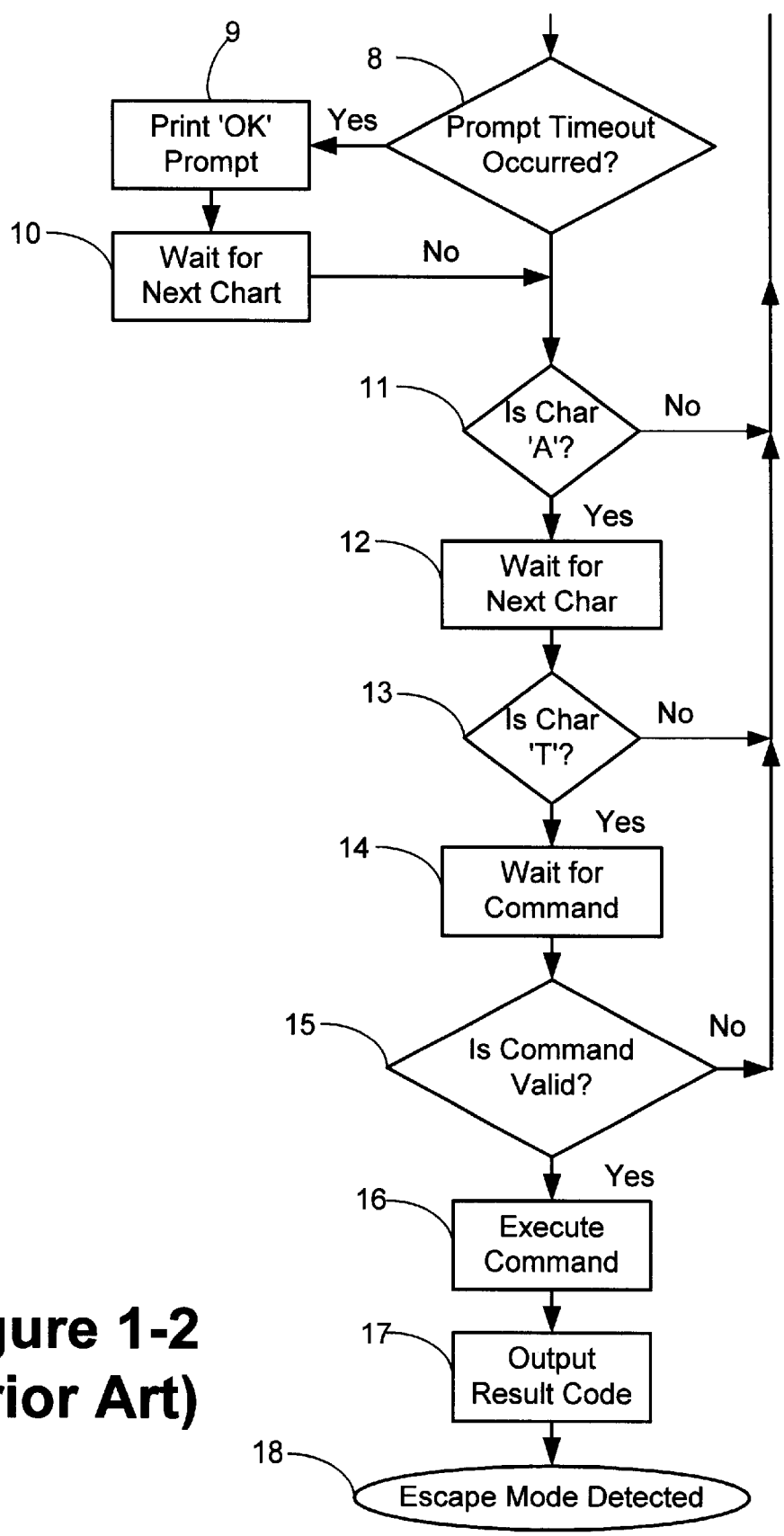
FIG. 2 is a block diagram of an embodiment of the present invention with a single channel modem.
Figure 2:
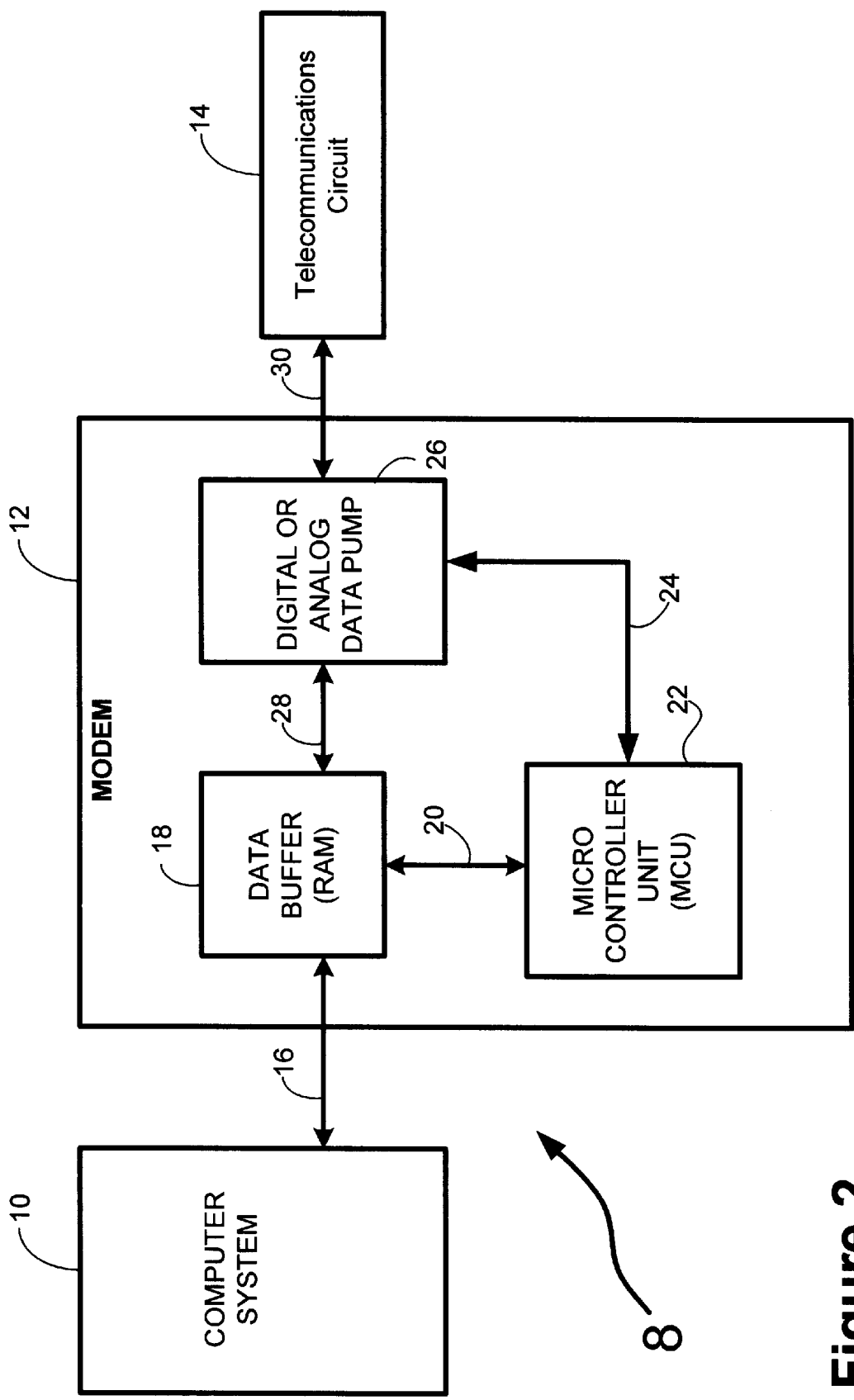

Referring now to FIG. 2, a communications system 8 according to various aspects of the present invention comprises: a computer system 10; a modem 12; and a telecommunications circuit 14. The modem 12 provides an interface between the computer system 10 and the telecommunications circuit 14 to facilitate transmission of data between the computer system 10 and remote users, such as a multiple remote user computer, connected to the telecommunications circuit 14.

The telecommunications circuit 14 comprises any suitable communications system, such as a telephone circuit, a cable television system, a satellite link, or any other appropriate analog or digital transmission system. The computer system 10 may be any system which sends and/or receives information from remote systems or users via the telecommunications circuit 14, including mainframes, laptop computers, personal computers, industrial machinery, kitchen appliances, cash registers, automated teller machines, aircraft, cars, satellite communications, and the like. Although the present embodiment relates to a computer having a telephone modem, various principles in accordance with the present invention may encompass substantially all forms of data interfaces which receive data and commands.

The modem 12 facilitates the transmission of data between the computer system 10 and the telecommunications circuit 14. Accordingly, the modem performs several functions, such as serial-to-parallel data conversion, parallel-to-serial data conversion, modulation and demodulation, and error detection. The modem 12 may comprise any suitable system for facilitating the exchange of data between the computer system 10 and the telecommunications circuit 14. The modem 12 is connected to the computer system 10 via a suitable communications medium, such as a conventional multi-bit bus 16. Similarly, the modem 12 is connected to the telecommunications circuit 14 via any appropriate connection, such as a conventional telephone line, an ISDN interface, a coaxial cable, a twisted pair cable, or any other suitable mechanism.

Referring to FIG. 2, the modem 12 of the present embodiment suitably comprises: a data buffer 18; a microcontroller unit (MCU) 22; and a channel interface 26. The MCU 22 may store and retrieve data from the data buffer 18 via a bus 20 and is suitably configured to determine the amount of data within the data buffer 18. The data buffer 18 is also suitably connected to the channel interface 26 via a bus 28. The channel interface 26 is also connected to the MCU 22 via a bus 24 and the telecommunications circuit 14 via a bus 30 to transfer data to and from the telecommunications circuit 14 and the data buffer 18.

The data buffer 18 comprises a storage system, suitably for storing data received from the telecommunications circuit 14 and/or computer system 10. The data buffer 18 may comprise any appropriate type of storage system, including random access memory (RAM), fixed disk drives, read/writable compact discs, and the like. When the computer system 10 sends data, commands, or other information to the modem 12, via a bus 16 the modem 12 may initially store the data in the data buffer 18 while the MCU 22 performs other tasks, such as processing previously received data or configuring or controlling the modem 12. In the present embodiment, the data buffer 18 is configured as a first-in/first-out (FIFO) system such that the data stored in the data buffer 18 the longest is typically the first data to be retrieved from the data buffer 18. In addition, the data buffer 18 may be separated into particular areas, such as an area for outbound data and another for inbound data. The area allotted to each area may be constant or variable, such as by the MCU 22, according to any suitable algorithm.

The channel interface 26 comprises an interface for transmitting and receiving information between the MCU 22, the data buffer 18, and the telecommunications circuit 14. For example, the channel interface 26 suitably receives serial data from the telecommunications circuit 14, converts the serial data to parallel data, such as 16-bit words, and transfers the parallel data to the data buffer 18. Conversely, the channel interface 26 suitably receives parallel data from the data buffer 18, converts the parallel data to serial data, and transmits the serial data to the telecommunications circuit 14. In the present embodiment, the channel interface 26 suitably comprises a digital or analog data pump which configures the data received by the modem 12 into a format suitable for transmission to a particular destination. The channel interface 26 may be connected to the telecommunications circuit 14 by any appropriate interface 30, for example a time division multiplexed (TDM) bus.

The MCU 22 controls the flow of data between the computer system 10, the data buffer 18, and the channel interface 26. Further, the MCU suitably performs various other control and management functions for the modem 12. The MCU 22 suitably comprises any appropriate controller for implementing control over the operations of the modem 12. In the present embodiment, the MCU 22 controls the storage and retrieval of data in the data buffer 18 and monitors the amounts of data stored in the data buffer 18.

Figure 3:
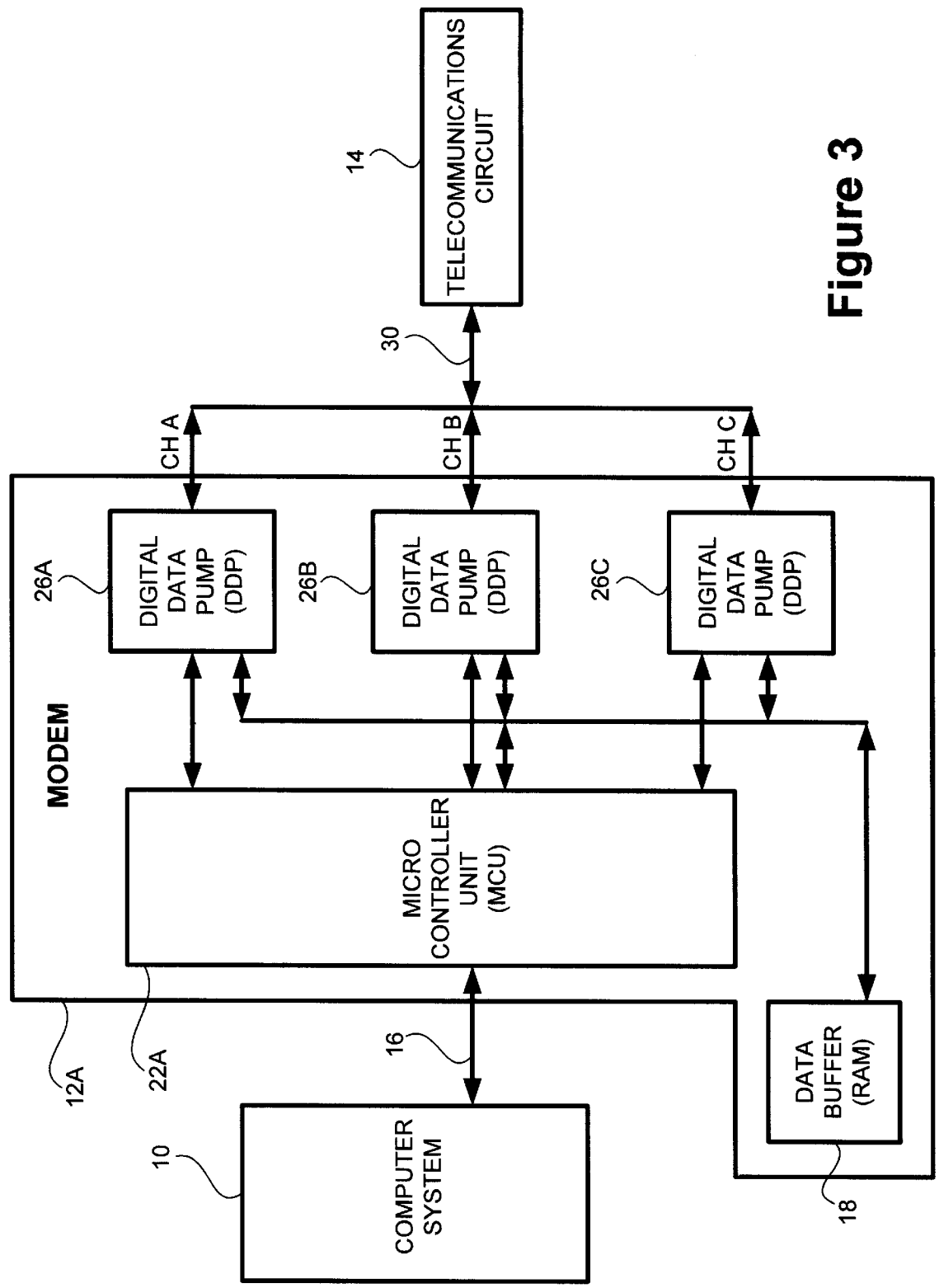
FIG. 3 is a block diagram of an embodiment of the present invention with a multi-channel modem.

In the configuration of FIG. 2, the modem 12 suitably provides only two physical links between the computer system 10 and the telecommunications circuit 14, one for outbound information and one for inbound information. The modem 12 may be implemented with only a single physical link for transmitting data only one way or alternately switching the direction of data flow. Alternatively, the modem 12 may provide multiple physical and/or logical channels. For example, referring now to FIG. 3, a modem 12A according to various aspects of the present embodiment comprises an access concentrator having multiple physical channels associated with multiple channel interfaces 26A, 26B, 26C. The computer system 10 is suitably connected to the modem 12A via a single bus, bus 16 for example using time division multiplexing or multiple logical channels. In this configuration, the data rate between the modem 12A and the computer system 10 is typically significantly higher than the data rate through each of the individual channel interfaces 26A, 26B, 26C.

The communications system 8 according to various aspects of the present invention tends to detect escape sequences, for example in the outbound data, by checking for the escape sequence in the data stored in the data buffer 18. In operation, the computer system 10 typically inserts an escape request into the data provided to the modem 12. The computer system 10 then suitably waits, sending no further data, until it receives an acknowledgment of the escape sequence. Only then does the computer system 10 begin providing command information to the modem 12.

The data buffer 18 is suitably only checked for escape sequences when the amount of data in the outbound area of the data buffer 18 is below a selected threshold. Because the computer system 10 stops sending data after sending the escape sequence, the escape sequence should be the last data in the data buffer 18. In the meantime, the modem 12 continues to process the data in the buffer until the amount of data reaches the threshold. The data buffer 18 is then searched for the escape sequence, the escape sequence is identified, the acknowledgment is sent to the computer system 10, and the modem 12 switches to command mode.

Figure 4:
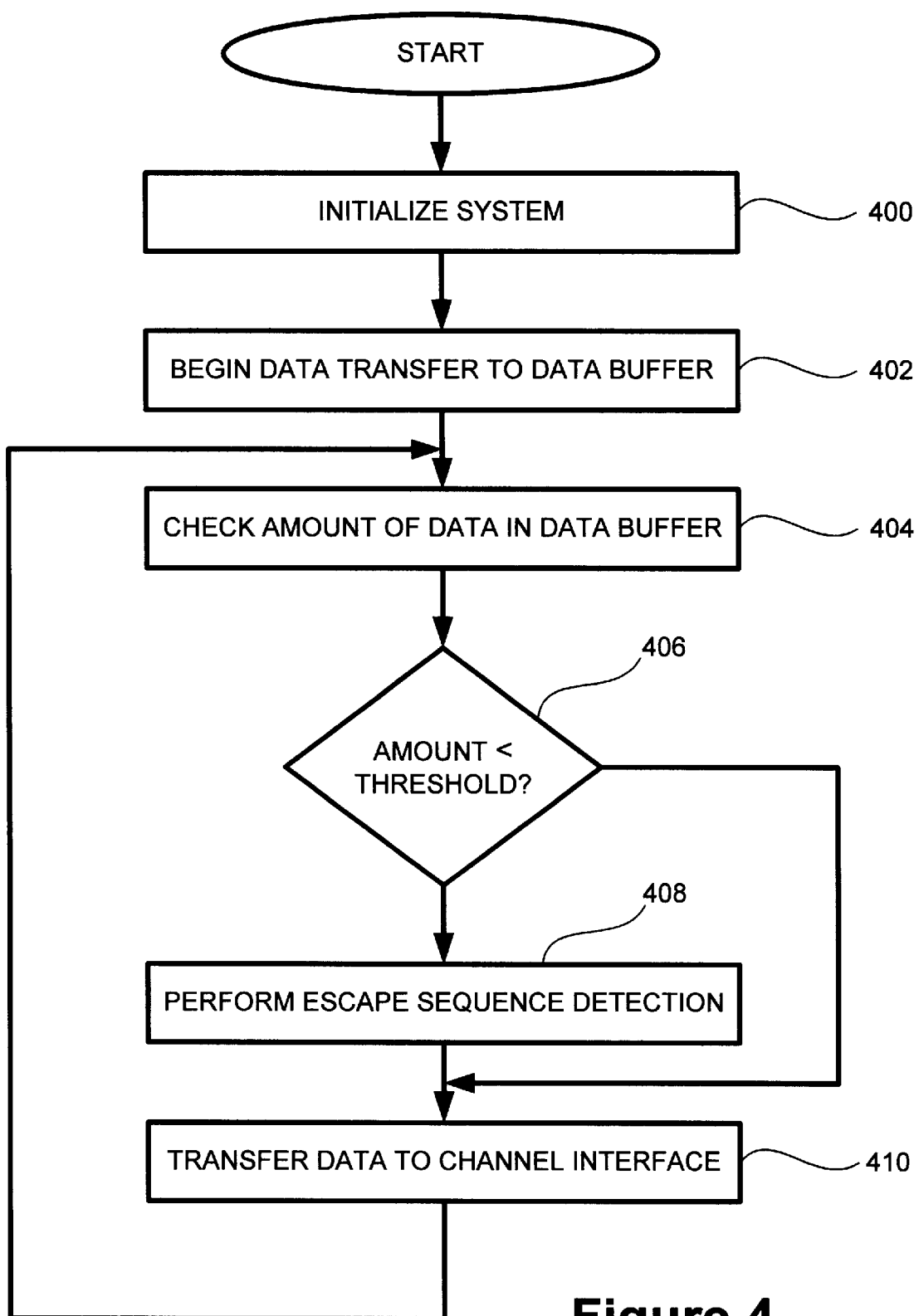
FIG. 4 is a flow chart of the general operation of the MCU for transferring data from the computer system to the channel interface.

For example, referring now to FIG. 4, the communication system 8 is suitably initialized to facilitate data transfer (step 400). Initialization suitably comprises clearing the data buffer 18 and receiving or generating various operating parameters for the modem, such as from a local memory like conventional CMOS or from the computer system 10. The computer system 10 may send operating parameters relating data rate, error checking, telephone numbers to dial, and the like. Initialization may also include establishing a connection with a remote system, such as by dialing a telephone number or answering an incoming call.

Following initialization, the modem 12 may begin transferring data (step 402). Data received from the computer system 10 is stored in the data buffer 18 prior to retrieval for transfer to the channel interface 26, and vice versa. As data is retrieved from the data buffer 18, the MCU 22 may periodically determine the amount of data stored in the data buffer 18 (step 404). Determining the amount of data in the data buffer 18 may be determined directly or indirectly, such as determining the amount of storage space remaining in the data buffer 18 and comparing it to the total storage capacity of the data buffer 18. The timing for determining the amount of data may be selected according to any suitable criteria. For example, every time the MCU 22 retrieves data from the data buffer 18 for routing to the channel interface 26, the available storage space within the data buffer 18 may be determined. The process for determining space remaining within a storage medium may be performed in any manner, for example in conjunction with conventional techniques.

After determining the amount of data in the data buffer 18, the MCU 22 compares the amount of data stored in the data buffer 18 with a selected threshold amount (step 406). The threshold amount indicates a minimum amount of data in the data buffer to forego checking for an escape sequence. The data within the data buffer 18 may be checked for an escape sequence when almost any predetermined quantity remains. For example, the selected threshold may correspond to as few as three characters, sufficient to detect the three plus "+++" characters of the escape sequence. The threshold may be selected to correspond to any quantity of data remaining within the data buffer 18 based on any suitable criteria, such as the particular command set utilized and the maximum command length available for the modem 12. In the present embodiment, the threshold is set to correspond to 40 data characters remaining in the data buffer 18.

If the amount of data remaining in the data buffer 18 is above the selected threshold, the MCU 22 suitably proceeds with transferring data to the channel interface 26 (step 410) until the next time to check the amount of data remaining in the data buffer 18. If the amount of data remaining within the data buffer 18 is below the threshold, the MCU 22 suitably initiates an escape sequence detection procedure. The escape sequence detection procedure is configured to identify a valid escape sequence received from the computer system 10.

Figure 5:
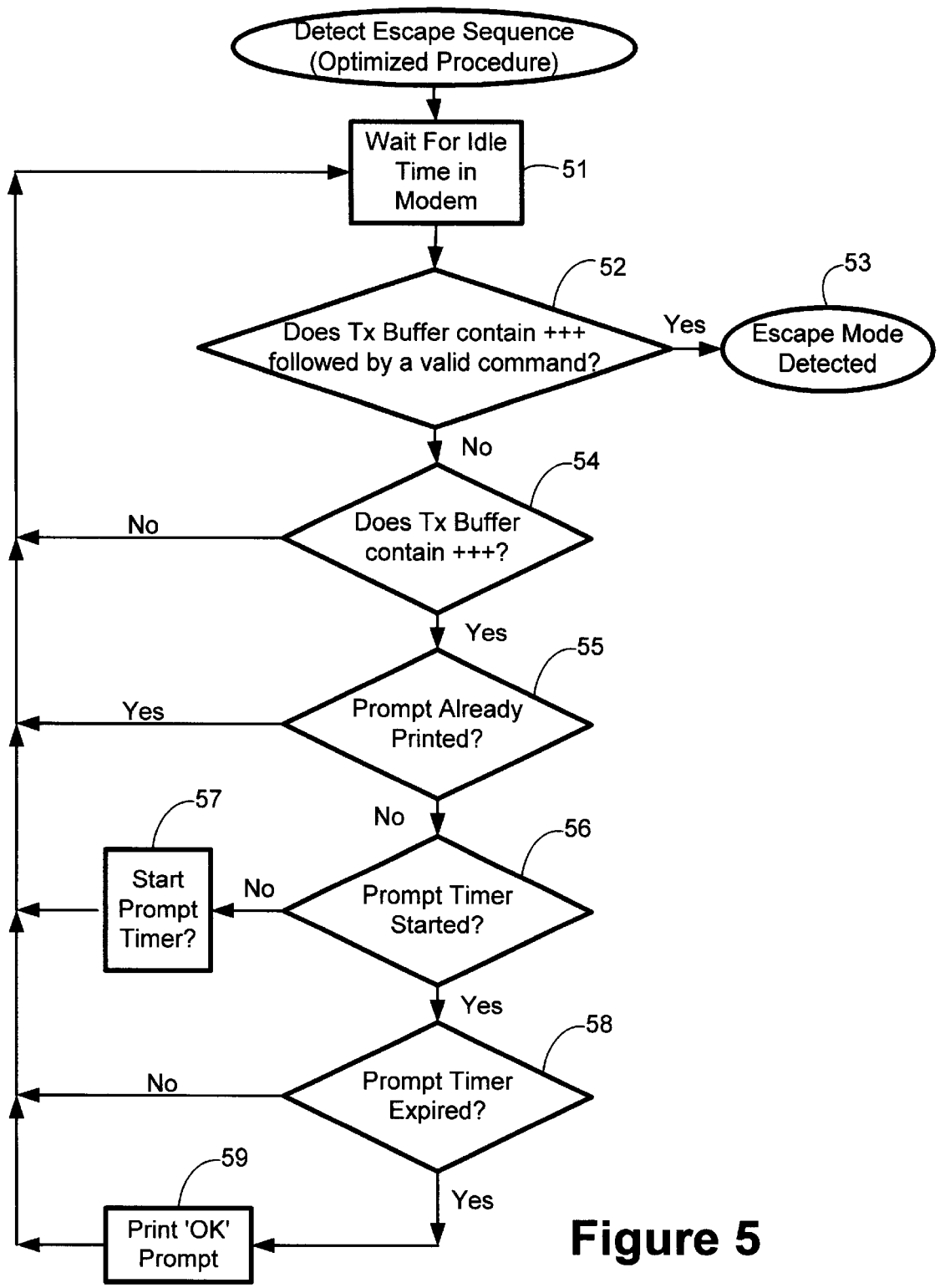
FIG. 5 is a flow chart of the algorithm utilized under the present invention to detect an escape sequence.

For example, referring now to FIG. 5, a suitable escape sequence detection procedure comprises initially waiting until the MCU 22 completes processing a set of data (step 51). The MCU 22 then suitably examines each character in the data buffer 18 until a valid escape sequence (for this example, "+++") is detected. If the escape sequence is detected and followed by a valid command, such as an AT command (step 52), then an escape mode is detected (step 53) and the MCU 26 suitably enters command mode and processes subsequent signals as commands until switched back to transmission mode, such as upon receipt of a carriage return signifying the end of the commands. If the escape sequence is not followed by an AT command, the MCU 22 determines whether the data buffer 18 contains the "+++" escape sequence (step 54). If not, the MCU returns to transmitting the data to the channel interface 26 (step 410 of FIG. 4).

If the escape sequence has been detected, the MCU 22 determines whether the acknowledgment has already been sent from the modem 12 to the computer system 10 (step 55). If the prompt has not been sent, a timer is started (step 56), preferably for one second (step 57) and processing resumes. If a valid AT command is not received before the expiration of the prompt timer (step 58), an "OK" prompt is sent from the modem to the host computer (step 59). The MCU 22 then proceeds with processing the data.

To summarize, in normal transmission operation, the computer system 10 transfers data to the data buffer 18 whenever space is available. When an escape sequence is provided, however, the computer system 10 waits to send additional commands or data until the computer system has received an "OK" from the modem, indicating the modem has received and acknowledged the command. As a result, the backlog within the buffer decreases until the escape sequence detection process is initiated.

The data buffer 18 of the present embodiment suitably comprises a 16 Kbyte memory. Additionally, the MCU 22 may transfer data from the data buffer 18 to the channel interface 26 at a particular maximum block size, for example 128 bytes per transfer. If more than 128 bytes of data remain in the data buffer 18 prior to the transfer, the MCU 22 does not perform an escape sequence detection procedure. On the other hand, if the amount of data within the data buffer 18 approaches the maximum block size of 128 bytes, an escape sequence may be imbedded within the remaining data.

Consequently, the amount of data transferred in each operation is suitably reduced to ensure detection of any escape sequence in the data.

The analysis of the data in the data buffer 18 preferably occurs on a FIFO basis. For the preferred embodiment, looking ahead in the buffer 18 is discouraged because data may only be processed by the modem 12 in the order in which it was received. Thus, should a momentary lapse of data being sent from the host computer to the modem occur, data transfer is not interrupted, as may occur in a system according to, for example, the Heatherington method.

Further, the transmission of an escape sequence in text, for example a manual explaining escape mode, does not tend to inadvertently switch the modem 12 to command mode. The modem 12 only begins to analyze individual characters when the amount of data within the data buffer 18 falls below a predetermined threshold. Thus, as long as the text including the "+++" escape sequence is followed by additional text, the MCU 22 is unlikely to detect the "+++" sequence.

The communication system according to the present embodiment conserves MCU 22 resources by eliminating unnecessary analysis for escape sequences. By searching for escape sequences only when the amount of data in the data buffer 18 falls below a predetermined threshold, various shortcomings of many conventional systems are avoided and the MCU 22 may be dedicated to other tasks. Additionally, although the present embodiment has been described in conjunction with the appended drawing figures, the invention is not so limited. Various additions, deletions, substitutions, and rearrangement of parts or method steps may be made without departing from the spirit and scope of the present invention, as set forth more particularly in the appended claims.

What is claimed is:

1. A communications system for transmitting data from a source to a destination, wherein the communications system operates in a transmission mode for transferring received data to the destination and a command mode for performing tasks according to the received data, and wherein the data includes an escape sequence for switching the communications system from the transmission mode to the command mode, comprising:
   a memory configured to store the data received from the source; and
   a controller coupled to said memory and configured to monitor the amount of data in said memory and check the data in said memory for the escape sequence only when the amount of data in said memory is below a predetermined threshold.

2. A method of detecting an escape sequence in a set of data stored in a memory for a communications system, comprising the steps of:
   determining an amount of data stored in the memory; and
   searching the data in the memory for the escape sequence only when said amount of data in the memory is below a selected threshold.

3. The communications system of claim 1 wherein said memory is configured as a first-in/first-out (FIFO) system.

4. The communications system of claim 1 wherein:
   the escape sequence comprises a predetermined string of characters followed by a valid AT command;
   said memory comprises at least one of a random access memory (RAM), a fixed disk drive, a read only memory (ROM), a programmable ROM (PROM), an electronically erasable PROM (EEPROM), a floppy drive, an optical drive, a tape drive, and a read/writable compact disc;
   said memory is configured as a first-in/first-out (FIFO) system; and
   said memory is configured to separate the data into particular areas and allot a variable size area for the data.

5. The communications system of claim 1 wherein said controller comprises a microcontroller unit configured to determine the quantity of data remaining within said memory and indicate when the quantity of data within said memory is less than a predetermined number of characters.

6. The communications system of claim 1 further comprising a channel interface coupled to said memory and said controller, and capable of being coupled to a telecommunications circuit.

7. The communications system of claim 1 wherein said memory coupled to said controller together comprise an access concentrator including at least one of a physical channel and a logical channel.

8. The communications system of claim 1 wherein said data in said memory is capable of being partitioned into areas and at least one of the size and number of said areas may be varied.

9. The communications system of claim 1 wherein
   said controller comprises a microcontroller unit configured to determine the quantity of data remaining within said memory and indicate when the quantity of data within said memory is less than a predetermined number of characters;
   said memory coupled to said controller together comprise an access concentrator including at least one of a physical channel and a logical channel; and
   said data in said memory is capable of being partitioned into areas and at least one of the size and number of said areas may be varied.

10. The method of claim 2 further comprising the step of periodically determining an amount of storage space available in the memory.

11. The method of claim 2 further comprising the steps of:
    configuring a modem associated with said communications system to be capable of switching from a transmission mode to a command mode; and
    commencing said command mode when the escape sequence is detected.

12. The method of claim 2 further comprising the steps of:
    configuring a modem associated with said communications system to be capable of switching from a transmission mode to a command mode;
    determining whether the escape sequence is followed by a valid command when the escape sequence is detected; and
    commencing said command mode when the escape sequence is detected.

13. The method of claim 2 further comprising the steps of:
    configuring a modem associated with said communications system to be capable of switching from a transmission mode to a command mode;
    transferring data to the memory;
    selecting a periodic interval at which to determine said amount of data in the memory; and
    commencing said command mode when the escape sequence is detected.

14. A method of detecting an escape sequence sent by a host system to instruct a modem to switch from a transmission mode to a command mode so that the modem may implement instructions provided by the host system, wherein the host system outputs data in the format of both messages and commands which are received into a data buffer and output from the data buffer so that the data may be processed by the modem and the messages may be routed to an output port, comprising the steps of:

checking a backlog of the data contained within the data buffer to determine when the amount of data is less than a predetermined threshold; and monitoring the data buffer for the escape sequence when the data is below said predetermined threshold.

15. The method of claim 14 further comprising the steps of:

detecting the escape sequence;

determining whether acknowledgement for detecting the escape sequence has been sent to the modem; and starting a timer if acknowledgment for detecting the escape sequence has not been sent to the modem; and sending a prompt from the modem to the host system at the expiration of said timer wherein said prompt indicates that the modem shall proceed with processing data in the format of messages.

16. The method of claim 14 further comprising the step of configuring the data buffer as a first-in/first-out (FIFO) system.

17. The method of claim 14 further comprising the step of commencing the command mode when the escape sequence is detected.

18. The method of claim 14 further comprising the step of detecting the escape sequence followed by a valid command and processing subsequent signals as commands.

19. The method of claim 18 further comprising the step of receiving a second command signifying the end of the command mode and subsequently switching to the transmission mode.

20. A modem capable of receiving data from a host system for configuring said modem and transmission over a communications circuit, said data including information data, escape data and command data, said modem comprising:

a data buffer configured to store said data;

a controller coupled to said data buffer; and a data pump coupled to said controller, said data pump being capable of transmitting said information data over said communications circuit;

wherein said controller determines an amount of said data remaining in said data buffer and if said amount of said data is less than a predetermined threshold, then said controller determines whether said data in said buffer includes said escape data.

21. The modem of claim 20, wherein after determining whether said data in said buffer includes said escape data, said controller further determines whether said data in said buffer includes said command data proceeding said escape data.

22. The modem of claim 21, wherein if said controller determines that said data in said buffer includes said command data proceeding said escape data, said controller configures said modem according to said command data.

23. The modem of claim 21, wherein if said controller determines that said data in said buffer does not include said command data proceeding said escape data, said controller starts a timer and upon expiration of said timer transmits a response to said host system.

24. The modem of claim 23, wherein said modem receives said command data from said host system after transmitting said response, and wherein said controller configures said modem according to said command data.

25. The modem of claim 20, wherein said data pump being further capable of transmitting said escape data over said communications circuit.

26. The modem of claim 20, wherein said escape data consists of three of same character.

27. The modem of claim 24, wherein said escape data consists of three '+' characters.

28. The modem of claim 20, wherein said command data includes an 'a' character followed by a 't' character.

29. A method for use by a modem capable of receiving data from a host system for configuring said modem and transmission over a communications circuit, said data including information data, escape data and command data, said method comprising:

storing said data in a data buffer;

determining an amount of said data remaining in said data buffer; and determining whether said data in said buffer includes said escape data if said amount of said data is less than a predetermined threshold.

30. The method of claim 29, wherein after said determining whether said data in said buffer includes said escape data, said method further comprises determining whether said data in said buffer includes said command data proceeding said escape data.

31. The method of claim 30, wherein if said data in said buffer includes said command data proceeding said escape data, said method further comprises configuring said modem according to said command data.

32. The method of claim 30, if said data in said buffer does not include said command data proceeding said escape data, said method further comprises starting a timer and transmitting a response to said host system upon expiration of said timer.

33. The method of claim 32 further comprises receiving said command data from said host system after said transmitting said response and configuring said modem lilt according to said command data.

34. The method of claim 29 further comprises: transmitting said information data over said communications circuit.

35. The method of claim 34 further comprises: transmitting said escape data over said communications circuit.

36. The method of claim 29, wherein said escape data consists of three of same character.

37. The method of claim 36, wherein said escape data consists of three '+' characters.

38. The method of claim 29, wherein said command data includes an 'a' character followed by a 't' character.

* * * * *